United States Patent
Singh (10) Patent No.: US 6,670,895 B2
(45) Date of Patent: Dec. 30, 2003

(54) METHOD AND APPARATUS FOR SWAPPING THE CONTENTS OF ADDRESS REGISTERS

(75) Inventor: Ravi Pratap Singh, Austin, TX (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/136,051

(22) Filed: May 1, 2002

(65) Prior Publication Data

US 2003/0208664 A1 Nov. 6, 2003

(51) Int. Cl.[7] .................................................. H03M 7/00
(52) U.S. Cl. ......................... 341/50; 708/490; 711/217; 711/219
(58) Field of Search ............................. 341/50, 81, 95, 341/60; 708/490, 603, 404, 409; 711/219, 200, 217, 218, 209

(56) References Cited

U.S. PATENT DOCUMENTS

| 5,535,365 | A | * | 7/1996 | Barriuso et al. ............ 711/155 |
| 5,550,987 | A | * | 8/1996 | Tanaka ....................... 710/106 |
| 5,623,621 | A | * | 4/1997 | Garde ......................... 711/220 |
| 5,812,845 | A | * | 9/1998 | Machida ...................... 717/154 |
| 5,867,690 | A | * | 2/1999 | Lee et al. ...................... 710/65 |
| 5,919,060 | A | * | 7/1999 | Lee ............................... 439/518 |
| 5,948,099 | A | * | 9/1999 | Crawford et al. ........... 712/225 |
| 6,128,710 | A | * | 10/2000 | Greenspan et al. ......... 711/152 |
| 6,502,117 | B2 | * | 12/2002 | Golliver et al. ............. 708/490 |
| 6,560,691 | B2 | * | 5/2003 | Chen ........................... 711/219 |
| 2002/0138535 | A1 | * | 9/2002 | Tsuji ........................... 708/603 |

* cited by examiner

Primary Examiner—Brian Young
Assistant Examiner—John Nguyen
(74) Attorney, Agent, or Firm—Wolf, Greenfield & Sacks, P.C.

(57) ABSTRACT

Methods and apparatus are provided for use in digital information processors that support digital memory buffers. In one aspect of the present invention, a digital signal processor receives a swap instruction and responds to the swap instruction by swapping the contents of a first address register and a second address register. In another aspect, a digital signal processor receives a swap instruction, swaps the contents of a first address register and a second address register in a future file, generates and sends one or more control signals to an architecture file in a downstream stage of a pipeline in response to the swap instruction, and swaps the contents of the first address register and the second address register in the architecture file in response to the one or more control signals.

25 Claims, 9 Drawing Sheets

METHOD AND APPARATUS FOR SWAPPING THE CONTENTS OF ADDRESS REGISTERS

FIELD OF THE INVENTION

The present invention relates to digital information processors, and more particularly, to methods and apparatus for use in digital information processors that support digital memory buffers.

BACKGROUND OF THE INVENTION

Many digital information processors provide digital memory buffers to temporarily store information. A digital memory buffer may be constructed of dedicated hardware registers wired together or it may simply be a dedicated section of a larger memory.

One type of digital memory buffer is referred to as a circular buffer. In a circular buffer, the first location of the buffer is treated as if it follows the last location of the buffer. That is, when accessing consecutive locations in the buffer, the first location automatically follows the last location.

It is desirable to quickly access the information that is stored in a circular buffer. For example, a digital information processor may have an execution pipeline to enhance throughput, yet information must be accessed quickly in order to take full advantage of the pipeline. Consequently, memory addresses (which are used to access the locations of the buffer) are often generated using a hardware-implemented address generator. One type of hardware-implemented address generator for a circular buffer maintains four registers for each circular buffer: (1) a base register, B, containing the lowest numbered address in the buffer, (2) an index register, I, containing the next address to be accessed in the buffer, (3) a modify register, M, containing the increment (or the decrement) value, and (4) a length register, L, containing the length of the buffer.

Figure 1:
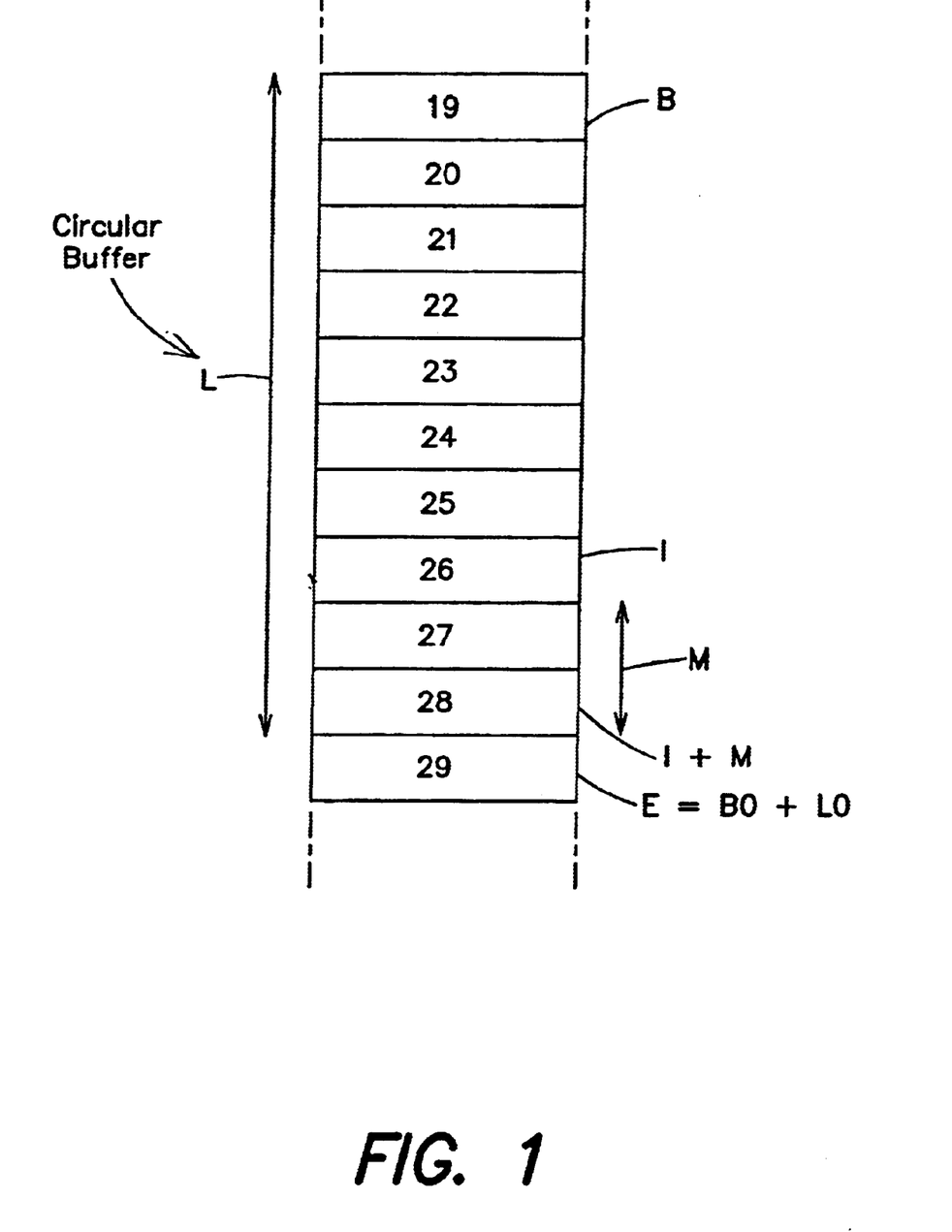
FIG. 1 shows an example of a circular buffer incorporated as a part of a larger memory.

FIG. 1 shows an example of a circular buffer, incorporated as a part of a larger memory, and address registers that may be maintained in association with the memory buffer. The lowest numbered address in the buffer, i.e., address 19, is referred to as the base address. The base address is stored in a base register, B. The highest address in the buffer, i.e., address 29, is referred to as the end address and is indicated as E. The length of the buffer is stored in a length register, L. An index register, indicated at I, is a pointer into the buffer. The index register typically contains the address of the next location to be accessed, e.g., address 26. After each access, the pointer is incremented or decremented a predetermined number of addresses so as to be prepared for the next access into the circular buffer. The number of address spaces which the pointer is incremented or decremented is the modify amount and is stored in a modify register, M. It is common for the modify amount to be a fixed number which does not change, although there are applications in which the modify amount may be varied.

Many digital information processing routines make use of memory buffers. One such routine is commonly referred to as a Fast Fourier Transform (FFT). FFT routines use a series of "butterfly" computations to generate a result. The results from one butterfly computation are used as the input data for the next butterfly computation.

Most FFT routines are written such that the input data for each butterfly computation is read from a particular memory buffer (referred to herein as an input buffer) and the results from each butterfly computation are stored in another memory buffer (referred to herein as an output buffer). Since the results of each butterfly computation are used as the input data for the next butterfly computation, the results must be "loaded" into the input buffer before the next butterfly computation can begin.

There are various ways that one could go about "loading" the results into the input buffer. One way is to simply copy the results from the output buffer to the input buffer. However, copying the results from one buffer to another may require a significant amount of time, relatively speaking, which adds significant overhead and thereby reduces the performance of the FFT routine.

Another way is to redirect the address registers associated with the input buffer so as to point to the addresses in the output buffer where the results from the previous butterfly computation are stored. In conjunction, the registers associated with the output buffer are typically redirected so as to point to the addresses previously used for the input buffer. This is done so that the results of a given butterfly computation can be stored without overwriting the input data for that butterfly computation. The overall effect of redirecting the address registers associated with the input and output buffers is the same as if the contents of the input buffer had been swapped with the contents of the output buffer.

The redirecting of the address registers is commonly carried out as follows: (1) the contents of the base register for the input buffer is swapped with the contents of the base register for the output buffer, and (2) the contents of the index register for the input buffer is swapped with the contents of the index register for the output buffer.

Figure 2A:
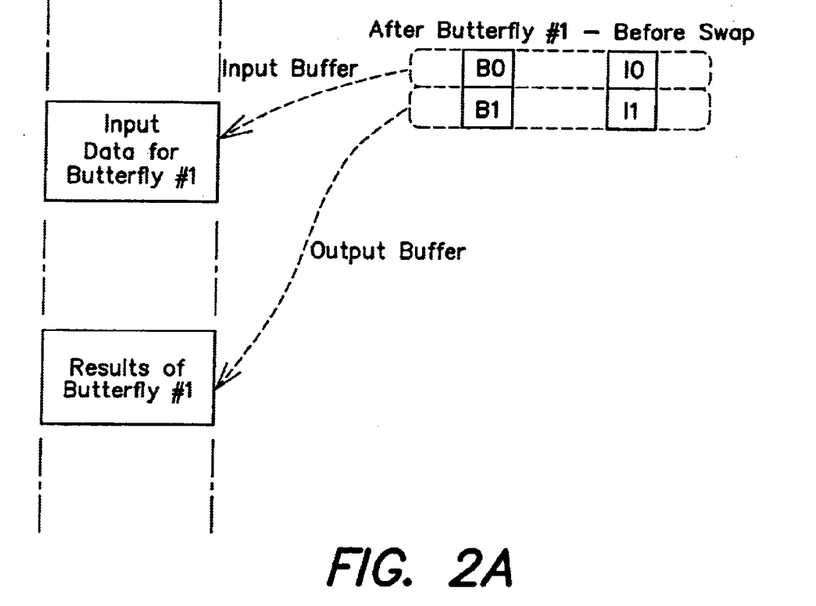
FIG. 2A is a representation of the contents of the base and index registers for the input and output buffers, prior to swapping the contents of address registers associated with the input buffer and the output buffer.

FIG. 2A is a representation of the contents of the base and index registers for the input and output buffers before the contents are swapped. Before the contents are swapped, the base register, B0, and the index register, I0, which in this example are associated with the input buffer, point to the input data used for butterfly computation #1. The base register, B1, and the index register, I1, which are associated with the output buffer, point to the results from butterfly computation #1.

Figure 2B:
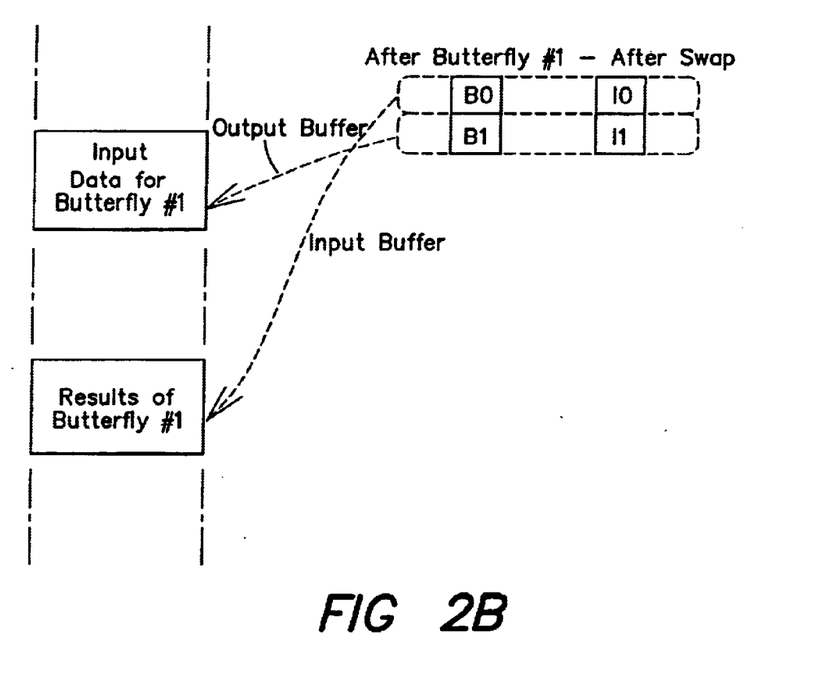
FIG. 2B is a representation of the contents of the base and index registers for the input and output buffers, after swapping the contents of address registers associated with the input buffer and the output buffer.

FIG. 2B is a representation of the contents of the base and index registers for the input and output buffers after the contents are swapped. After the contents of the registers are swapped, the base register, B0, and the index register, I0, associated with the input buffer, point to the results for butterfly computation #1. The base register, B1, and the index register, I1, associated with the output buffer, point to the input data used for butterfly computation #1.

Figure 3:
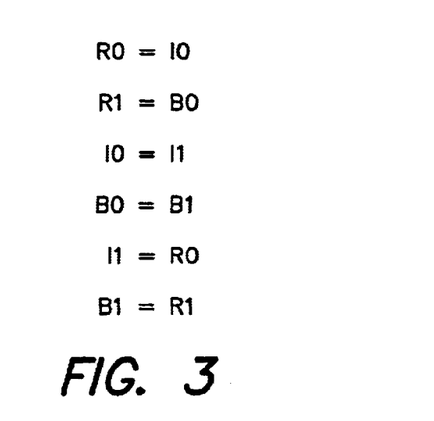
FIG. 3 shows a routine that is commonly used to swap the contents of the index and base registers of the input buffer with the contents of the index and base registers of the output buffer.

FIG. 3 shows a routine that is commonly used to swap the contents of the index and base registers of the input buffer with the contents of the index and base registers of the output buffer. This routine includes six instructions and uses temporary registers R0, R1.

Notwithstanding the performance level of current digital information processors, further improvements are needed.

SUMMARY OF THE INVENTION

According to one aspect of the present invention, a method is used in a digital information processor having a first address register for storing a first address and having a second address register for storing a second address. The method includes responding to a swap instruction, which specifies a swap operation for at least two address registers that are identified explicitly or implicitly, by swapping the contents of the first address register and the second address register.

According to another aspect of the present invention, a digital information processor includes a first address register for storing a first address, a second address register for storing a second address, and a circuit that receives a swap instruction, which specifies a swap operation for at least two address registers that are identified explicitly or implicitly, and responds to the swap instruction by swapping the contents of the first address register with the contents of the second address register.

According to another aspect of the present invention, a digital information processor includes a first address register for storing a first address, a second address register for storing a second address, and means, responsive to a swap instruction, which specifies a swap operation for at least two address registers that are identified explicitly or implicitly, for swapping the contents of the first address register and the second address register.

According to another aspect of the-present invention, a data address generator (DAG) includes a first address register containing a first address corresponding to a location in a first circular buffer, a second address register containing a second address corresponding to a location in a second circular buffer, and a circuit that receives a signal that indicates a swap instruction and responds to the signal by swapping the contents of the first address register and the second address register.

Depending on the implementation, a swap instruction may completely eliminate the need for temporary registers to carry out the swap, which in turn reduces the register pressure and helps to reduce the possibility of delays due to excessive register demand (delays can reduce the execution speed and level of performance of the routine running on. the processor). Again, depending on the implementation, the swap instruction may reduce or completely eliminate data dependencies like those in the routine of FIG. 3 and any associated wait cycles (data dependencies and wait cycles can reduce the execution speed and level of performance of a routine running on the processor).

According to another aspect of the present invention, a method for use in a digital information processor includes swapping the contents of a first address register and a second address register in a future file in response to a swap instruction, generating and sending one or more control signals from the future file to the architecture file in response to a swap instruction, and swapping the contents of the first address register and the second address register in an architecture file in response to the one or more control signals.

It has been recognized that the latter mentioned aspect of the present invention is not limited to swap instructions, but rather may be applied to pipelined data processors in general, particularly in a situation where the results of an operation are needed at more than one stage in the pipeline. For example, rather than performing an operation at one stage and pipelining the results to subsequent stage(s), the capability to actually carry out the operation may be provided at more than one stage in the pipeline. Thereafter, only control signals (and not the results) need be provided to subsequent stage(s). Depending on the embodiment, this may lead to a reduction in the required area and/or power.

Notwithstanding the potential advantages, discussed above, of one or more embodiments of one or more aspects of the present invention, it should be understood that there is no absolute requirement that any embodiment of any aspect of the present invention address the shortcomings of the prior art.

DETAILED DESCRIPTION

It has been determined that the routine shown in FIG. 3 has several drawbacks. First, the need for temporary registers increases the register pressure (a measure of the level of demand for temporary registers) within a processor. If the demand for temporary registers becomes excessive (in comparison to the number of temporary registers) shortages can result, thereby leading to delays, which in turn reduces the execution speed and level of performance of the routine running on the processor. This problem is particularly noticeable in a processor having relatively few temporary registers.

Second, the last four instructions in the routine can not be executed until one or more previous instructions have been completed (a situation referred to herein as data dependency). If a processor has a very deep pipeline (i.e., a pipeline that is divided into many stages), wait cycles may need to be added because of these dependencies (i.e., to make sure that certain instructions are not executed before the prior instructions are completed). Thus, even though the routine of FIG. 3 has only six instructions, eight to ten (or even more) instruction cycles may be required to complete the routine. During such time, no other instructions can be input to the pipeline, which reduces the overall throughput through the pipeline and reduces the execution speed and level of performance of a routine running on the processor.

Thus, it would be desirable to eliminate the need to use the routine of FIG. 3.

It has been determined that this may be accomplished by providing a swap instruction.

Figure 4A:
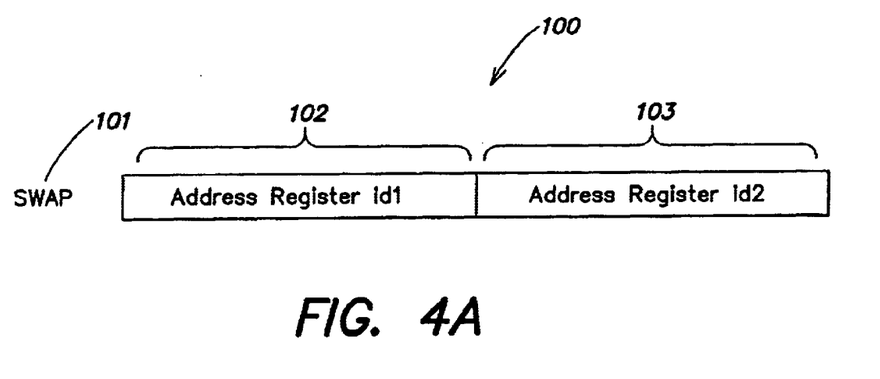
FIG. 4A shows an example of a swap instruction format according to one embodiment of the present invention.

FIG. 4A shows an example of a swap instruction format 100 according to one embodiment of the present invention. The instruction format has an op code, e.g., SWAP, that identifies the instruction as a swap instruction and is indicated at 101. The instruction format also has two operands fields, e.g., address register id1, address register id2, which identify the address registers that are to have their contents swapped and are indicated at 102, 103.

As used herein, the term swap means to exchange the contents. This may be carried out in any manner. The term address register refers to a data address register, which is defined as any register that contains a memory address for use in accessing a memory location or any register that contains data for use in generating a memory address for use in accessing a memory location. Examples of address registers include but are not limited to base registers, B, index pointer registers (or simply index registers), I, modifier registers, M, length registers, L, and end registers, E. The address registers are often integrated into a data address generator (DAG), further discussed herein below.

An example of a swap instruction that uses the instruction format of FIG. 4A is:

SWAP I0, I1.

This instruction calls for the contents of index register I0 to be swapped with the contents of index register I1.

Another example of a swap instruction that uses the instruction format of FIG. 4A is:

SWAP B0, B1

This instruction calls for the contents of base register B0 to be swapped with the contents of the base register B1.

The availability of a swap instruction reduces the number of instructions and the number of instruction cycles needed to swap the contents of address registers, thereby increasing the speed and level of performance of a digital information processor. A swap instruction may also reduce the need for temporary registers, which in turn reduces the register pressure and thereby reduces the possibility of delays due to excessive register demand (recall that delays can reduce the execution speed and level of performance of the routine running on the processor).

It should be recognized that the present invention is not limited to the swap instruction format shown in FIG. 4A and that other swap instruction formats may be used.

For example, in some embodiments, the address registers are not specified in the instruction, but rather are implied, for example, based on the op code. In such embodiments, the digital information processor may be configured, for example, to automatically swap particular address registers whenever a swap instruction is supplied. Alternatively, for example, a plurality of different swap instructions may be supported, each having a different op code. The different op codes may implicitly identify the particular address registers to be swapped. For example, the instruction:

SWAP01 may call for the contents of the address register I0 to be swapped with the contents of the address register I1. The instruction:

SWAP23 may call for the contents of the address register I2 to be swapped with the contents of the address register I3.

In some embodiments, a single swap instruction causes more than one swap operation to be carried out. The additional address registers may be implied based on the opcode (e.g., as discussed above). Alternatively, for example the additional address registers may be implied based on the supplied operands. For example, the digital information processor may be configured such that if two index registers are supplied as operands in a swap instruction, then the processor swaps the two index registers and also swaps the base registers that are associated with the two index registers. For example, in one embodiment, the swap instruction:

SWAP I0, I1 may (1) cause the contents of the I0 register to be swapped with the contents of the I1 register and, (2) cause the contents of the B0 register to be swapped with the contents of the B1 register. One such embodiment is described below with respect to FIG. 7B.

Figure 4B:
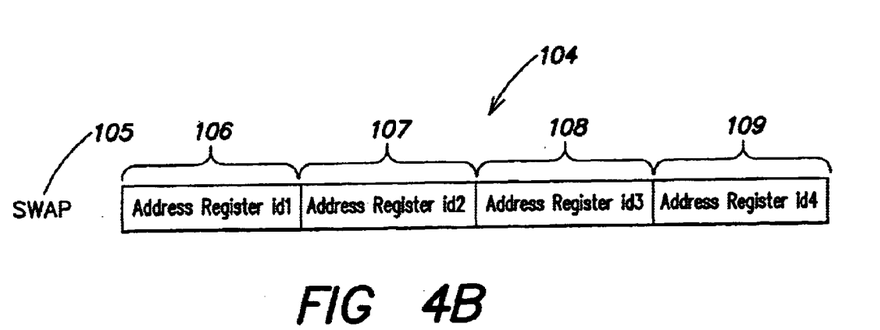
FIG. 4B shows an example of another swap instruction format according to one embodiment of the present invention.

Another way to implement a swap instruction that causes more than one swap operation to be carried out is to provide an instruction format that includes more than two operand fields. FIG. 4B shows an example of an instruction format 104 with more than two operand fields. The instruction format 104 has an op code, e.g., SWAP, that identifies the instruction as a swap instruction and is indicated at 105. The instruction format has four operands fields, e.g., address register id1, address register id2, address register id3, address register id4, which identify the address registers that are to have their contents swapped and are indicated at 106, 107, 108, 109.

An example of a swap instruction that uses the instruction format of FIG. 4B is:

SWAP I0,I1, B0, B1.

This instruction calls for the contents of index register I0 to be swapped with the contents of index register I1, and calls for the contents of base register B0 to be swapped with the contents of base register B1.

Using a single swap instruction to cause more than one swap operation further reduces the number of cycles needed to swap the contents of address registers, thereby increasing the speed and level of performance of a digital information processor. In some embodiments, the number of instructions needed to swap the contents of the address registers is reduced from six to one, and the number of instruction cycles is reduced from eight (or more) to as few as one.

Digital information processors that execute swap instructions are now discussed.

Figure 5:
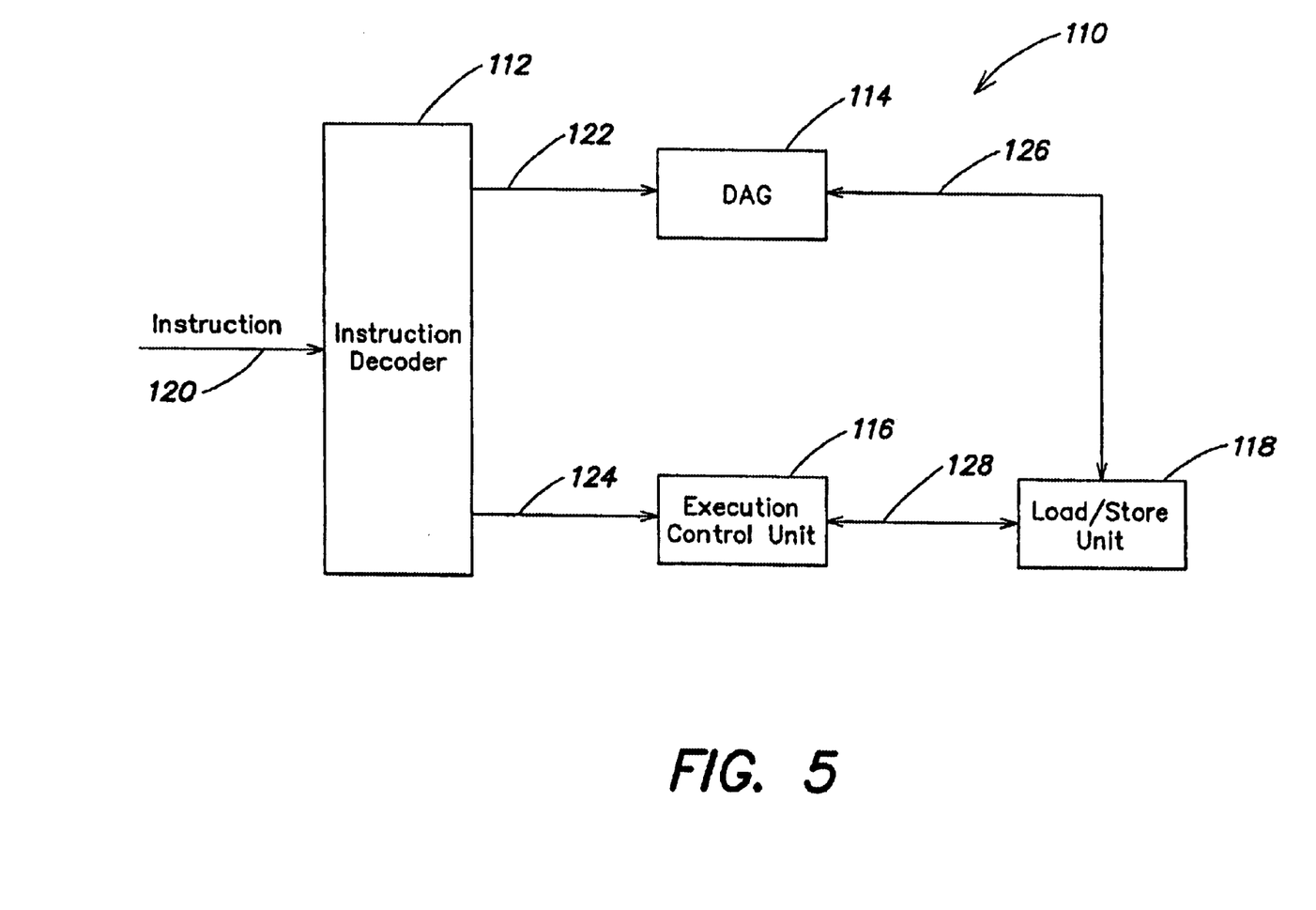
FIG. 5 is a block diagram of a portion of a digital information processor that receives and executes a swap instruction, according to one embodiment of the present invention.

FIG. 5 is a block diagram of a portion of a digital information processor 110 that receives and executes a swap instruction, according to one embodiment of the present invention. The digital information processor 110 includes an instruction decoder 112, a data address generator (DAG) 114, an execution control unit 116, and a load/store unit 118. The DAG 114 provides addresses for use in loading and storing data to memory buffers (not shown). The digital information processor 110 may be configured as a single monolithic integrated circuit, but is not limited to this configuration.

The input to the instruction decoder 112 is connected to a bus indicated at a line 120. Signal lines, indicated at 122, connect the instruction decoder to the DAG 114. Signal lines, indicated at 124, connect the instruction decoder 112 to the execution control unit 116. Signal lines, indicated at 126, connect the DAG 114 to the load/store unit 118. Signals lines, indicated at 128, connect the load/store unit 118 to the execution control unit 116.

In operation, an instruction is fetched (e.g., from an instruction cache or other memory (not shown)) and provided to the instruction decoder 112 on the bus 120. If the instruction is a DAG instruction (i.e., an instruction having to do with the DAG), then the instruction decoder 112 outputs a decoded DAG instruction and/or other control signals, which are supplied through the signal lines 122 to the DAG 114. If the instruction is a not a DAG instruction (i.e., an instruction not having to do with the DAG), then the instruction decoder 112 outputs a decoded instruction and/or other control signals that are supplied through the signal lines 124 to the execution/control unit 116.

The DAG 114 executes DAG instructions and, if appropriate, outputs addresses of data to be accessed in the memory buffers. The addresses are supplied on the signal lines 126 to the load/store unit 118, which loads and/or stores data to/from the addresses in the memory buffer, as appropriate. The load/store unit 118 passes data to/from the execution control unit 116 by way of the signal lines 128.

It should be understood that there are many different types of DAGs. The present invention is not limited to use in association with any particular type of DAG.

Figure 6:
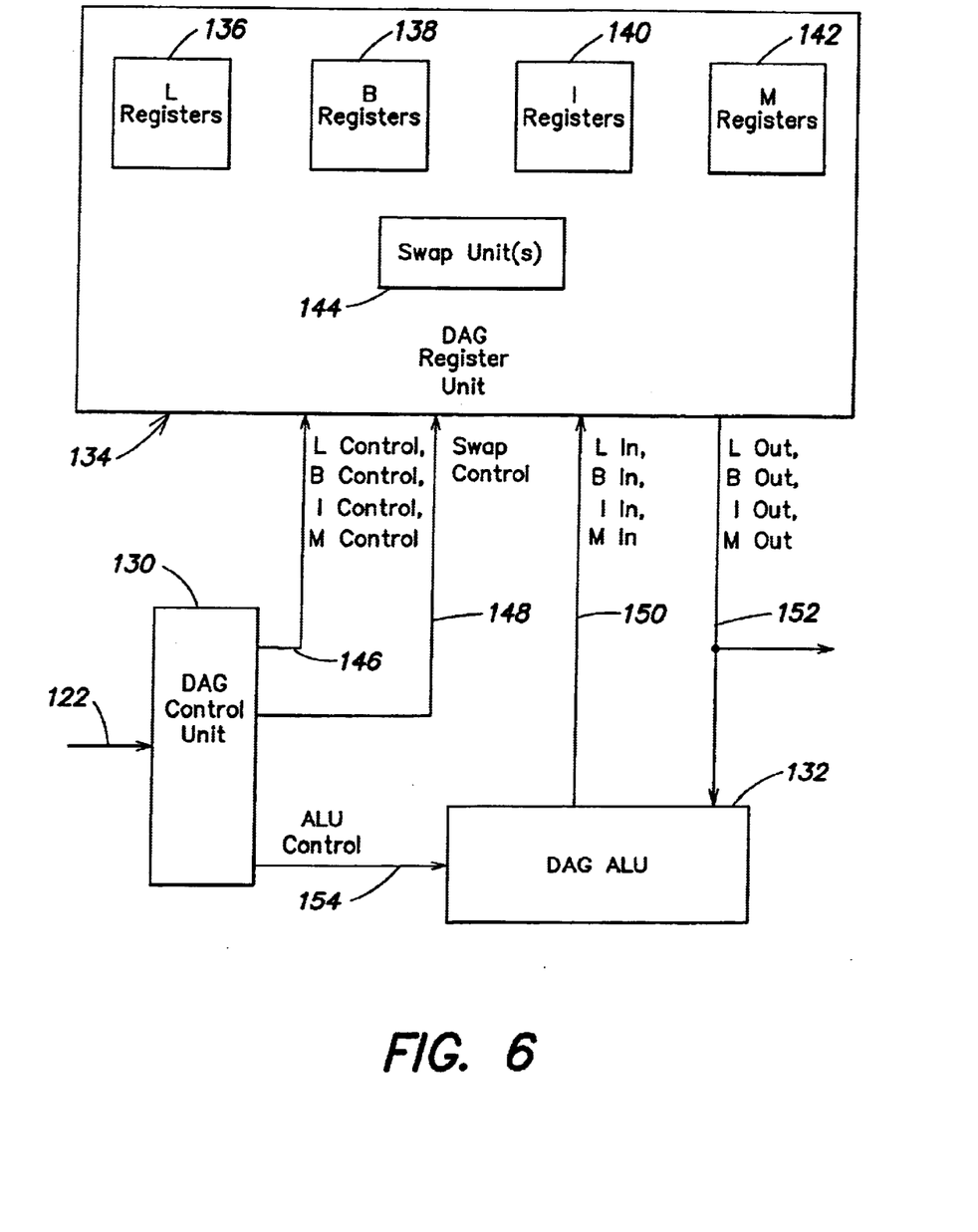
FIG. 6 is a block diagram of one embodiment of the DAG of FIG. 5.

FIG. 6 is a block diagram of one embodiment of the DAG 114 (FIG. 5). This embodiment includes a DAG control unit 130, a DAG arithmetic logic unit (DAG ALU) 132, and a DAG register unit 134. The DAG register unit 134 includes four register banks 136–142 and one or more swap units 144. The four register banks include L registers 136 for storing data indicating the length of each memory buffer, B registers 138 for storing the base address of each memory buffer, I registers 140 for storing an index address of each memory buffer, and M registers 142 for storing an increment (or decrement) value. The index address may, for example, indicate the address currently being accessed or the next address to be accessed. The swap units 144 are typically implemented in hardware and are further described below.

The DAG control unit 130 is connected via signal lines 122 to instruction decoder 112 (FIG. 5). Signal lines, indicated at 146, connect the DAG control unit 130 to the L, B, I, M registers 136–142. Signal lines, indicated at 148, connect the DAG control unit 130 to the swap unit 144. Signal lines, indicated at 150, and signal lines, indicated at 152, connect the DAG register unit 134 to the DAG ALU 132. In some embodiments, the L, B, I, M registers 136–142 may also connect to an address and/or data bus (not shown) to load and/or store from/to memory.

In operation, the DAG control unit 130 receives the decoded DAG instructions and/or control signals from the instruction decoder 112 (FIG. 5). In response to such instruction and/or control signals, the DAG control unit 130 produces control signals that are used to execute the DAG instruction. The term "in response to" means "in response at least to", so as not to preclude being responsive to more than one thing. Here for example the DAG control unit 130 produces L, B, I, M register control signals, which are supplied to the L, B, I, M registers 136–142. The DAG control unit 130 also produces swap control signals and ALU control signals. The swap control signals are supplied to the swap unit 144. The swap unit 144 swaps the contents of the appropriate address registers in response to the swap control signals. The ALU control signals are supplied to the DAG ALU 132. The DAG register unit 134 provides output signals L out, B out, I out, M out that indicate the contents of one of the L, B, I, M registers respectively. These signals are supplied to the DAG ALU 132 and to the load/store unit 118 (FIG. 5). The DAG ALU 132 performs computations to generate new addresses L in, B in, I in, M in, which are supplied to the DAG register unit 134, to be stored in one of the L, B, I, M registers 136–142, respectively.

Figure 7A:
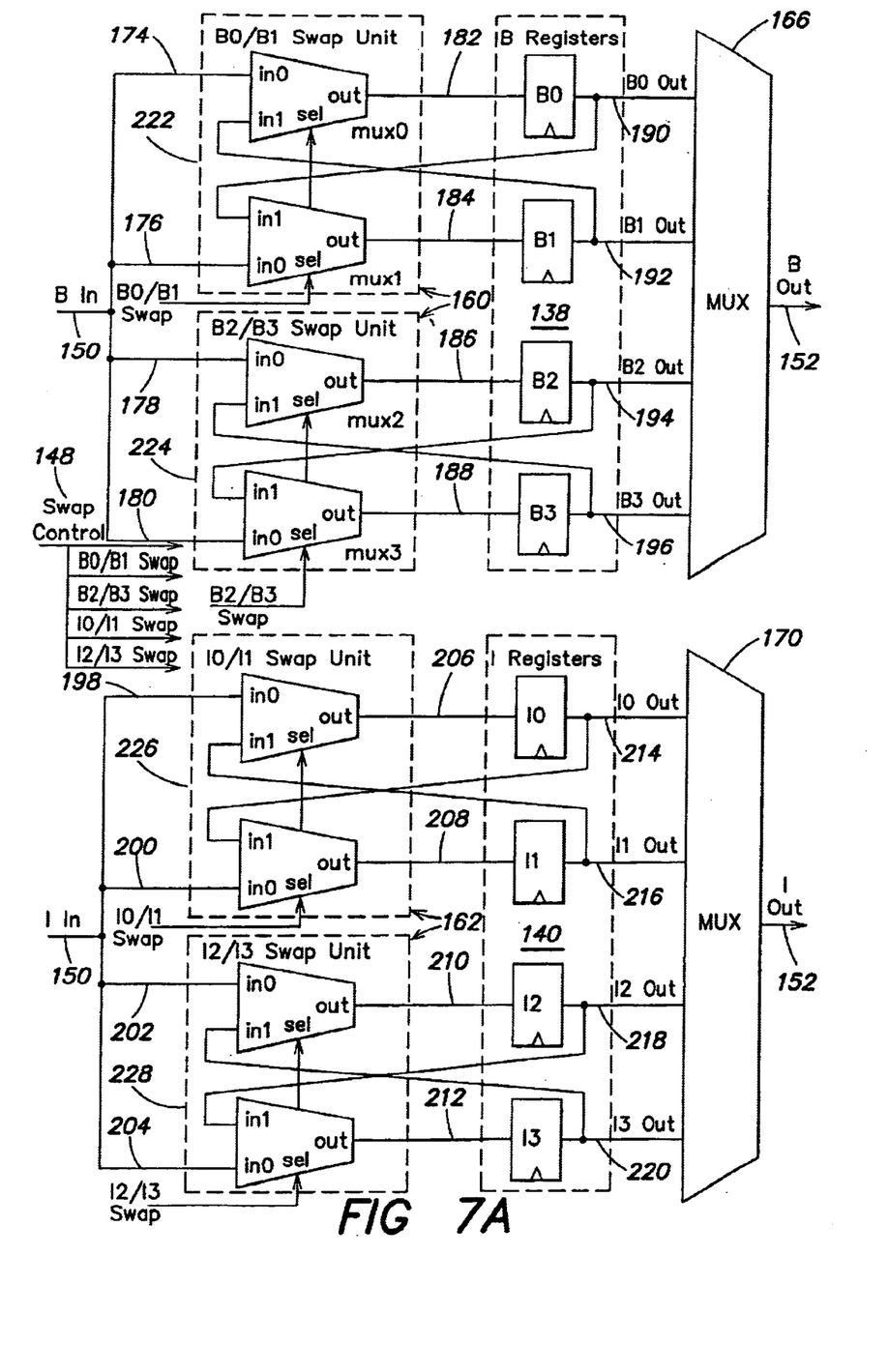
FIG. 7A is a block diagram of a portion of one embodiment of the register unit of FIG. 6.

FIG. 7A is a block diagram of a portion of one embodiment of the register unit 134 (FIG. 6). In this embodiment, the register unit is capable of swapping the contents of the B registers 138 and is capable of swapping the contents of the I registers 140, as described below.

In this embodiment, the register unit includes a B register bank 138, a B register swap unit 160, an I register bank 140, and an I register swap unit 162. The B register bank 138 includes four registers, B0–B3. The I register bank 140 includes four registers, I0–I3. Each of the B registers and each of the I registers has a CLK input that receives its own CLK signal (not shown) from the DAG control unit (FIG. 6).

The register unit further includes a B out mux 166 and an I out mux 170. Each is controlled by control signals (not shown) from the DAG control unit (FIG. 6). The B in signal is supplied, via the signal lines 150, to a first set of inputs (in0) of the B register swap unit 160. Outputs of the B register swap unit 160 are connected via signal lines indicated at 182–188 to inputs of the B register bank 138. Outputs of the B register bank 138 are connected via signal lines indicated at 190–196 to a second set of inputs (in1) of the B register swap unit 160 and to inputs of the B out mux 166. The output of the B out mux 166 provides the B out signal on the signal lines 152.

The I in signal is supplied via the signal lines 150 to a first set of inputs (in0) of the I register swap unit 162. Outputs of the I register swap unit 162 are connected via signal lines indicated at 206–212 to inputs of the I register bank 140. Outputs of the I register bank 140 are connected via signal lines indicated at 214–220 to a second set of inputs (in1) of the I register swap unit 162 and to inputs of the I out mux 170. The output of the I out mux 170 provides the I out signal on the signal lines 152.

This embodiment of the B register swap unit 160 includes a. B0/B1 swap unit 222 and a B2/B3 swap unit 224. The I register swap unit 162 includes a I0/I1 swap unit 226 and a I2/I3 swap unit 228. These four swap units 222–228 are identical to one another. The swap units have select lines to receive swap control signals on the signal lines 148 from the DAG control unit 130 (FIG. 6). For example, in this embodiment, the swap control signals from the DAG control unit (FIG. 6) include the following four control signals: a B0/B1 swap signal, a B2/B3 swap signal, an I0/I1 swap signal, and an I2/I3 swap signal. The B0/B1 swap signal is supplied to select line, sel, of the B0/B1 swap unit 222. The B2/B3 swap signal is supplied to select line, sel, of the B2/B3 swap unit 224. The I0/I1 swap signal is supplied to select line, sel, of the I0/I1 swap unit 226. The I2/I3 swap signal is supplied to select line, sel, of the I2/I3 swap unit 228.

The operation of the swap units is now described with reference to the B0/B1 swap unit 222. The B0/B1 swap unit 222 has two operating states, specifically, a swap state and a non-swap state. In the swap state, the B0/B1 swap unit 222 enables the contents of the B0 register to be swapped with the contents of the B1 register. In the non-swap state, the B0/B1 swap unit 222 provides a transparent connection between the B in signal on signal lines 150 and the B registers 138.

Selection of the operating state is controlled by the logic state of the B0/B1 swap signal, which is provided to the select input of the B0/B1 swap unit 222. In this embodiment, if the B0/B1 swap signal has a first logic state (e.g., a logic high state or "1"), then the B0/B1 swap unit is in the swap operating state. If the B0/B1 swap signal has a second logic state equal (e.g., a logic low state or "0"), then the B0/B1 swap unit is in the non-swap operating state.

In the swap state, mux 0 of swap unit 222 selects the output of the B1 register, and mux 1 of swap unit 222 selects the output of the B0 register. If provided with a pulse on its CLK line, the B0 register stores the contents of the B1 register and the B1 register stores the contents of the B0 register, i.e., the contents of the B0 register and the B1 register are swapped.

In the non-swap state, the mux 0 of swap unit 222 selects the B in signal on signal lines 150, and mux 1 of swap unit 222 selects the B in signal on signal lines 150. If the B0 register or the B1 register is provided with a pulse on its CLK line, then the register provided with the pulse stores the address provided by the B in signal on signal lines 150.

The other swap units 224–228 operate similarly to the B0/B1 swap unit 222. Thus, the B2/B3 swap unit 224 enables the contents of the B2 register to be swapped with the contents of the B3 register. The I0/I1 swap 226 unit enables the contents of the I0 register to be swapped with the contents of the I1 register. The I2/I3 swap unit 228 enables the contents of the I2 register to be swapped with the contents of the I3 register.

As stated above, in some embodiments, a single swap instruction causes more than one swap operation to be carried out. In some embodiments this is carried out by providing a swap instruction that includes additional oper- and fields (e.g., as in FIG. 4B). In other embodiments the additional address registers may be implied.

For example, in one embodiment, the swap instruction SWAP I0, I1, causes the contents of the I0 register to be swapped with the contents of the I1 register and causes the contents of the B0 register to be swapped with the contents of the B1 register. This may be implemented by configuring the DAG control unit 130 such that the swap instruction SWAP I0, I1 causes the DAG control unit 130 to assert both the I0/I1 swap signal and the B0/BI swap signal. Similarly, the swap instruction SWAP I2, I3, may cause the contents of the I2 register to be swapped with the contents of the I3 register and may cause the contents of the B2 register to be swapped with the contents of the B3. This may be implemented by configuring the DAG control unit 130 such that the swap instruction SWAP I2, I3 causes the DAG control unit 130 to assert both the I2/I3 swap signal and the B2/B3 swap signal. This could be implemented by asserting appropriate control signals in the embodiment of FIG. 7A.

Figure 7B:
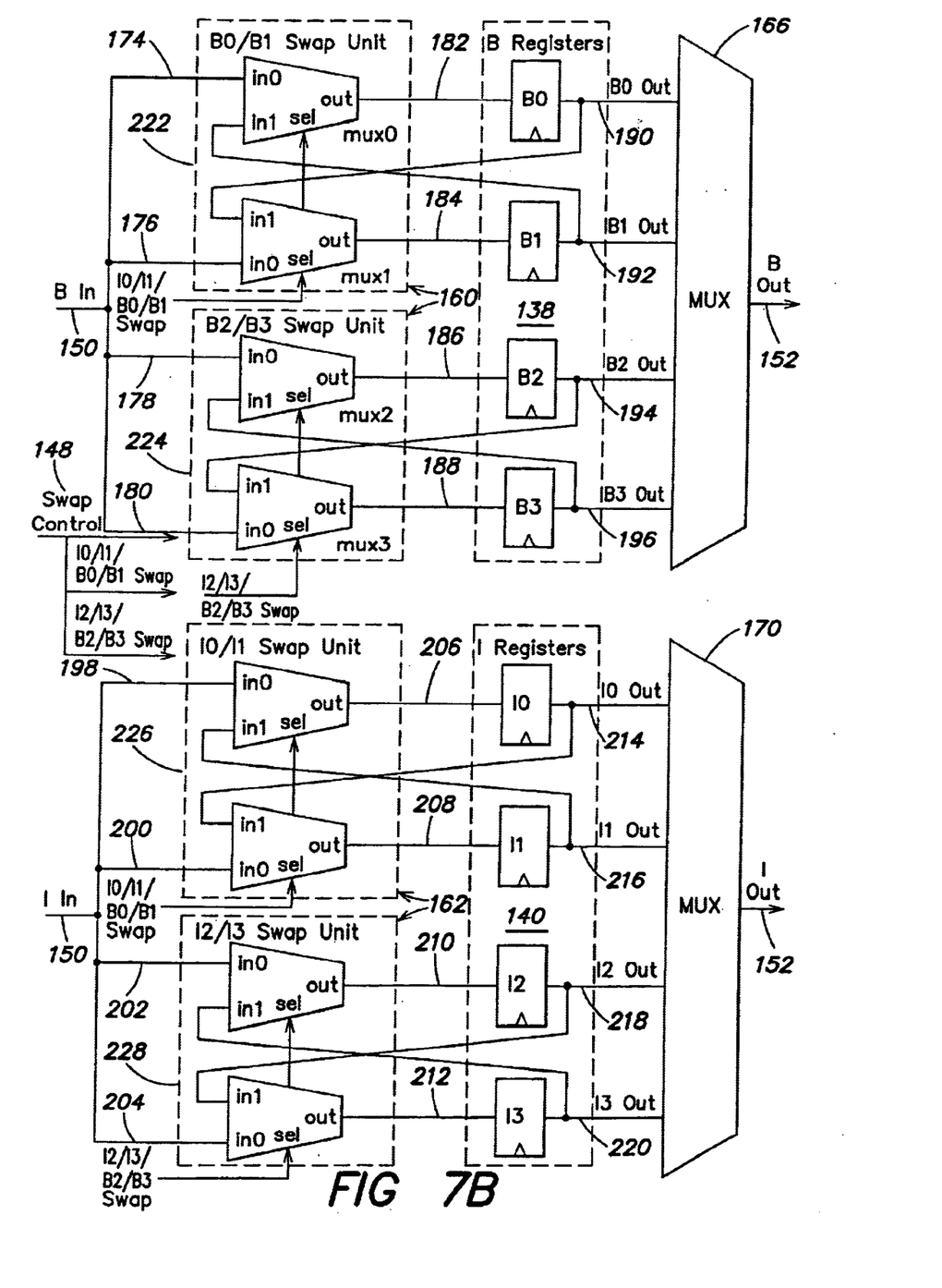
FIG. 7B is a block diagram of a portion of another embodiment of the register unit of FIG. 6.

FIG. 7B shows another implementation of such an embodiment. This implementation is identical to the implementation of FIG. 7A, except that in the implementation of FIG. 7B, the swap control signals on the signal lines 148 from the DAG control unit 130 (FIG. 8) include two control signals: a I0/I1/B0/B1 swap signal and a I2/I3/B2/B3 swap signal. The I0/I1/B0/B1 swap signal is supplied to the select line of the B0/B1 swap unit 222 and to the select line of the I0/I1 swap unit 226. The I2/I3/B2/B3 swap signal is supplied to select line of the B2/B3 swap unit 224 and to the select line of the I2/I3 swap unit 228.

As stated above, providing the ability to execute a swap instruction reduces the number of instruction cycles needed to swap the contents of address registers, thereby increasing the speed and level of performance of a digital information processor (recall that data dependencies and wait cycles can reduce the execution speed and level of performance of a routine running on the processor). Providing this ability also reduces the need for temporary registers, which in turn reduces the register pressure and thereby reduces the possibility of delays due to excessive register demand (recall that delays can reduce the execution speed and level of performance of the routine running on the processor).

Now that swap instructions and DAGs have been discussed, considerations relating to implementing a swap instruction in a digital information processor with a pipeline are discussed.

It should be recognized that FIGS. 7A, 7B show various embodiments of a DAG register unit that has swap units. However, the DAG register unit and the swap units(s) are not limited to the implementations shown. For example, a swap unit can be implemented in many ways. Using multiplexers is just one way. For example, multiplexers can be replaced by groups of tri-state drivers wherein each of the tristate drivers receives a different enable signal. The enable to a tristate driver could, for example, be based on the swap control signal. The multiplexers could also be replaced by combinatorial logic. Thus, for example, the invention is not limited to how the swap is carried out.

Figure 8:
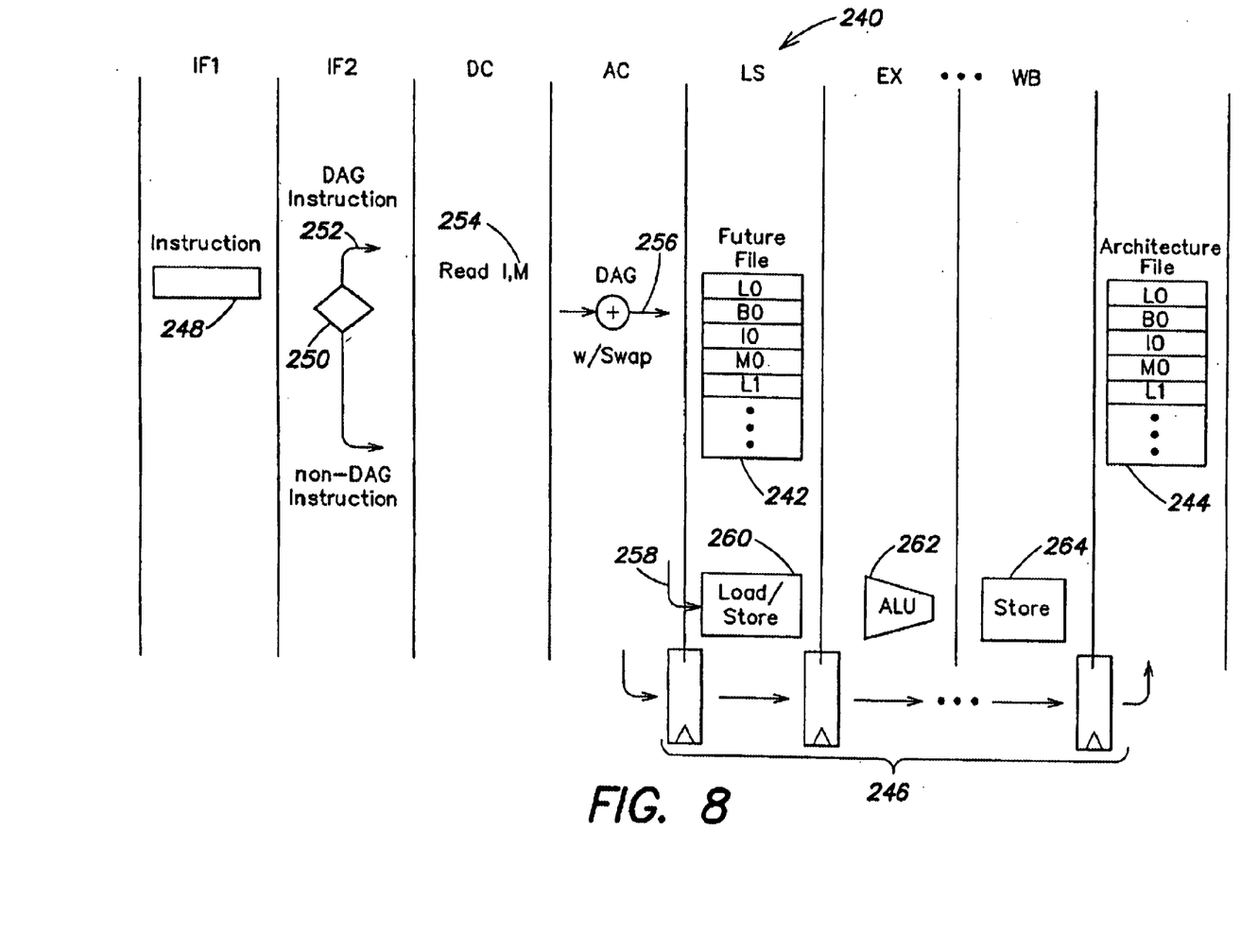
FIG. 8 shows a representation of one example of a digital information processor pipeline capable of receiving and executing a swap instruction, according to one embodiment of the present invention.

FIG. 8 shows one embodiment of a pipeline 240. This pipeline 240 has a series of stages, seven of which are shown, i.e., IF1, IF2, DC, AC, LS, EX1, WB. The pipeline 240 operates in association with a DAG that includes two versions of each address register (e.g., two L registers, two B registers, two I registers, and two M registers). One version of each of the registers is collectively referred to herein as a future file, indicated at 242. The other version of each of the registers is collectively referred to herein as an architecture file, indicated at 244. The future file 242 and the architecture file 244 are connected by a DAG pipeline 246. As further described below, the future file 242 is read and updated in the course of generating and modifying addresses that are used for accessing the memory buffers. The future file 242 tends to show the speculative state of the address registers. The architecture file 244, on the other hand, is updated pursuant to an instruction when that instruction completes execution. The use of two versions of each address register enables the hardware to speculatively execute instructions with reduction in throughput only if there is a misprediction.

Instructions are inserted into the pipeline 240 and proceed through the pipeline stages until execution of the instruction is complete. More specifically, instructions, indicated at 248, are fetched in the IF1 stage. In the IF2 stage, the instructions 248 are decoded 250 and identified as DAG instructions or non-DAG instructions. If instruction 248 is a DAG instruction 252, then at the DC stage, an I register and an M register of the future file 242 are read (indicated at 254).

In the AC stage, the DAG generates addresses 256 which are to be supplied to the load/store unit 260. DAG swap instructions are executed, for example, as described above with respect to FIGS. 4–7B. In the LS stage, addresses generated by the DAG are supplied 258 to the load/store unit 260 which loads data in response thereto. The addresses generated by the DAG are stored in the future file 242. In addition, DAG information is input to the DAG pipeline 246, which is used to send DAG information to the architecture file 244, as discussed with respect to FIG. 9.

ALU operations 262 are performed in the EX stage (or EX stages). In the WB stage, the results from the ALU operations are stored 264, thereby completing execution of the instructions. Upon completion, information from the DAG pipeline is used to update the architecture file 244. In this way, the architecture file 244 shows the state of the address registers pursuant to the most recent instruction to exit the pipeline 240, but does not show the effects of instructions currently in the pipeline 240.

In some embodiments, the DAG generates up to two new addresses in any given instruction cycle. Both of the new addresses are forwarded to the architecture file, and consequently, the DAG pipeline address bus is wide enough to forward two addresses at a time.

It should be recognized that a two-address wide bus is wide enough to forward the results of a swap instruction if the swap instruction does not modify more than two address registers in any given instruction cycle. The situation is complicated, however, if the swap instruction causes more than one swap operation (i.e., swaps the contents of more than two address registers) in any given instruction cycle. For example, the swap instruction discussed above with respect to FIG. 7B causes the contents of the I0 register to be swapped with the contents of the I1 register and causes the contents of the B0 register to be swapped with the contents of the B1 register. Such a swap instruction modifies the contents of four address registers (I0, I1, B0 and B1 registers) in a single instruction cycle.

A two-address-wide address bus is not wide enough to forward four addresses at one time. The width of the address bus would need to be doubled (i.e., from a width of two addresses to a width of four addresses) in order to forward four addresses at one time. Doubling the width of the address, bus would double the number of registers needed in the DAG pipeline, and would thereby result in an increase in chip area and power consumption.

Figure 9:
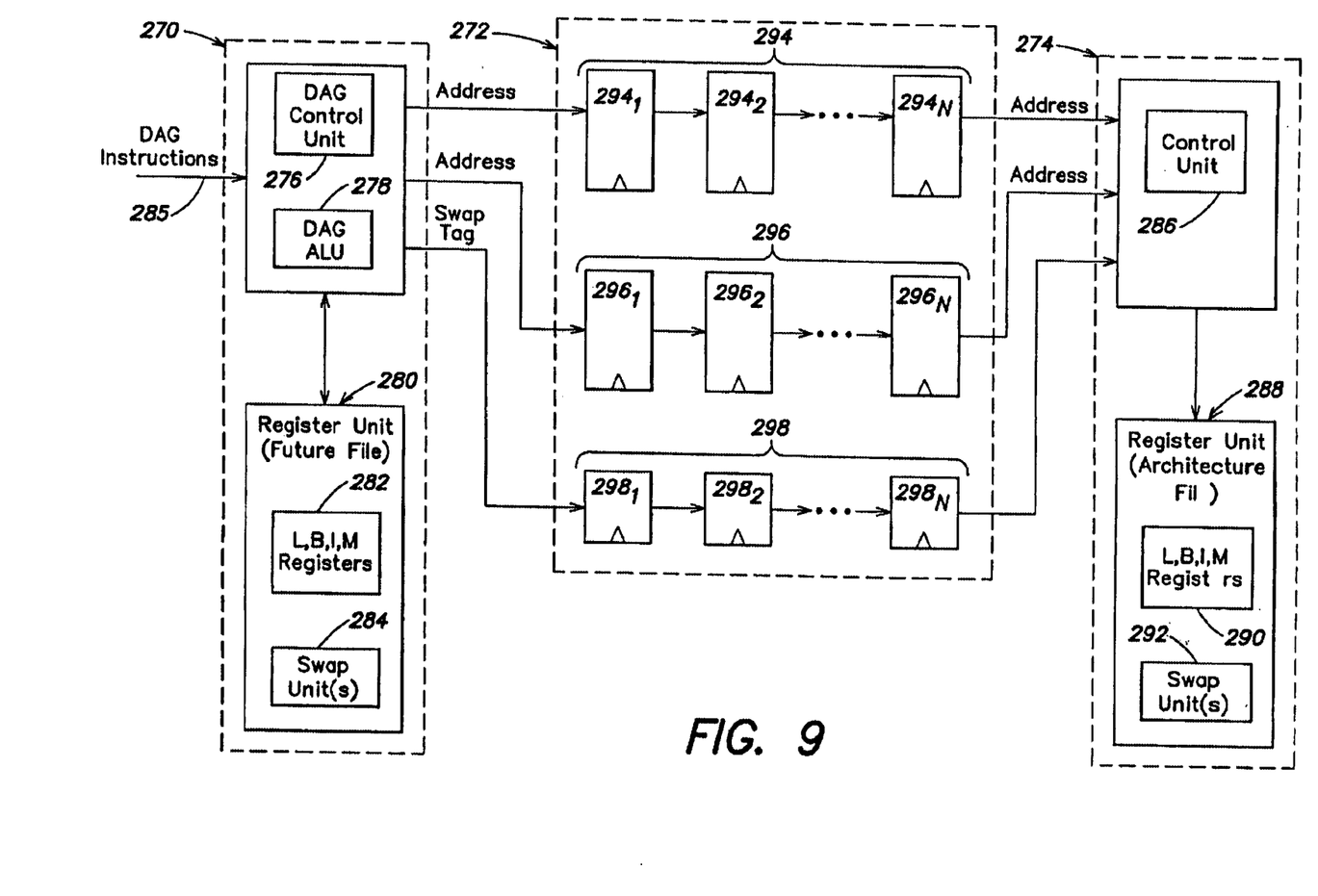
FIG. 9 is a block diagram of one embodiment of a DAG that may be used in the pipeline of FIG. 8.

FIG. 9 shows one embodiment of a DAG adapted to address the situation where a swap instruction causes more than one-swap operation in an instruction cycle. In this embodiment, the results of such a swap instruction are not forwarded through the DAG pipeline. Rather, two swap units are employed, and one swap unit is downstream of the other in the pipeline. When a swap instruction is received, the upstream swap unit executes the swap operation on the future file. Control signals (rather than the four new addresses) are generated and are forwarded through the pipeline to the downstream swap unit, which in turn executes the swap operation on the architecture file. The overall effect is the same as if the four new addresses had been forwarded through the pipeline, but without the need to double the size of the address bus.

In this embodiment, the DAG includes an upstream portion 270, a DAG pipeline 272, and a downstream portion 274. The upstream portion 270 includes a DAG control unit 276, a DAG ALU 278, and a register unit 280 which includes L, B, I, M registers 282 (i.e., the future file) and one or more swap units 284. The DAG control unit 276, the DAG ALU 278, and the register unit 280 may for example be similar to the DAG control unit 130, the DAG ALU 132, and the register unit 134, respectively, described hereinabove with respect to FIGS. 5–7B.

The upstream portion receives DAG instructions supplied by way of signal lines indicated at 285. The DAG ALU 278 performs computations to generate new addresses and the swap unit(s) 284 swap the contents of the address registers, as appropriate. The DAG control unit 276 and the swap unit(s) 284 are configured such that a single swap instruction may cause more than one swap operation to be carried out in a single instruction cycle. Such a configuration means that a swap instruction may modify the contents of four (or more) address registers in a single instruction cycle.

The downstream portion 274 includes a control unit 286 and a register unit 288, which includes L, B, I, M registers 290 (i.e., the architecture file) and one or more swap units 292. The register unit 288 may for example be similar to the register unit 134 described hereinabove with respect to FIGS. 6–7B. As further discussed hereinbelow, providing one or more swap units 292 in the register unit 288 of the downstream portion 274 of the DAG makes it unnecessary to forward the results of a swap instruction to the downstream portion 274 of the DAG.

The DAG pipeline 272 connects the upstream portion 270 to the downstream portion 274. In this embodiment, the pipeline 272 includes first, second and third pipelined data paths 294–298. Each of the pipelined paths 294–298 comprises a series of pipelined register stages. That is, the first pipelined data path includes pipelined register stages $294_1$–$294_N$.

The second pipelined data path includes pipelined register stages $296_1$–$296_N$. The third pipelined data path includes pipelined register stages $298_1$–$298_N$.

By providing a pipeline to send results from the upstream portion 270 to the downstream portion 274, system designers are able to reduce the complexity of the downstream portion 274. For example, unlike the upstream portion 270 of the DAG, the downstream portion 274 of the DAG does not require a control unit capable of receiving and responding to DAG instructions. Nor does it require an ALU that performs computations to generate new addresses.

The first data path 294 and the second data path 296 are each used to forward addresses that have been generated by the DAG ALU 278. Consequently, the register stages $294_1$–$294_N$ in the first data path 294 and the register stages $296_1$–$296_N$ in the second data path are typically at least as wide as the width of the DAG address registers. When the control unit in the downstream portion 274 of the DAG receives addresses from the first and/or the second data path 294, 296, the addresses are copied into the appropriate address register in is the architecture file 290.

The third data path 298 is used to forward information relating to the swap instruction. As stated above, because the upstream portion 270 of the DAG and the downstream portion 274 of the DAG each have one or more swap units, there is no need to pipeline the results of a swap instruction to the downstream portion 274 of the DAG. Thus, the register stages $298_1$–$298_N$ in the third data path 298 need not be as wide as the register stages $294_1$–$294_N$, $296_1$–$296_N$ of the first and second data paths 294, 296. In some embodiments, the third data path 298 merely forwards a signal that indicates whether the upstream portion 270 of the DAG has received a swap instruction. In other embodiments, the third data path 298 may be used to forward a signal that indicates address registers that are to have their contents swapped. When the downstream portion 274 of the DAG receives signal(s) from the third data path 298, the control unit 286 provides control signals to the register unit 288 in the downstream portion 274 so as to cause the contents of the appropriate registers of the register unit to be swapped.

Thus, providing one or more swap units in the register unit of the downstream portion of the DAG helps to eliminate the need to forward the results of a swap instruction to the downstream portion of the DAG. This in turn makes it possible to implement a swap instruction that swaps the contents of two base registers and two index registers without the need to pipeline four addresses at time. Indeed, in this embodiment, the swap instruction is implemented on the architecture file even without the need to use the first or second data paths 294, 296, because there is no need to forward any addresses in connection with the swap instruction. Note that two additional data paths would be needed in order to pipeline four addresses at a time, which would increase the cost, size and/or power consumption of the data information processor.

It has been recognized that aspects of the present invention are not limited to swap instructions, but rather may be applied to pipelined data processors in general, particularly in situations where the results of an operation are needed at more than one stage in the pipeline. For example, rather than performing an operation at one stage and pipelining the results to subsequent stage(s), the capability to actually carry out the operation is provided at more than one stage in the pipeline. This may be accomplished by providing an operator (i.e., an execution unit) at each of those stages. Thereafter, only control signals (and not the complete results) need be provided to those stages, wherein the control signals instruct the operator at each of those stages to carry out the operation.

Although the data address generator shown above comprises a control unit, an ALU, and a register unit with four banks of address registers, it should be understood that a data address generator is not limited to this configuration. A data address generator only needs to be able to generate addresses to be stored in address registers and to modify the contents of the address registers. Moreover, it should be understood that the present invention is not limited to use in association with a data address generator.

While there have been shown and described various embodiments, it will be understood by those skilled in the art that the present invention is not limited to such embodiments, which have been presented by way of example only, and that various changes and modifications may be made without departing from the spirit and scope of the invention. Accordingly, the invention is limited only by the appended claims and equivalents thereto.

What is claimed is:

1. A method for use in a digital information processor, the method comprising:
    providing a first address register configured to hold a first memory address corresponding to a first memory location;
    providing a second address register configured to hold a second memory address corresponding to a second memory location; and
    responding to a swap instruction, which specifies a swap operation for address registers that are identified explicitly or implicitly, by swapping the contents of the first address register and the second address register.

2. The method of claim 1 wherein responding comprises:
    decoding the swap instruction and generating a signal that indicates a swap instruction; and
    responding to the signal that indicates a swap instruction by swapping the contents of the first address register and the second address register.

3. The method of claim 2 wherein responding to the signal comprises supplying the first address from the first address register to the second address register and supplying the second address from the second address register to the first address register.

4. The method of claim 2 wherein responding to the signal comprises:
    receiving the signal that indicates a swap instruction, and generating control signals in response at least thereto;
    supplying the first address from the first address register to the second address register in response to one or more of the control signals;
    supplying the second address from the second address register to the first address register in response to one or more of the control signals; and
    storing the first address in the second address register and storing the second address in the first address register.

5. The method of claim 1 wherein the first address register is associated with a first memory buffer and the second address register is associated with a second memory buffer.

6. The method of claim 1 wherein the swap instruction includes an op code that identifies the swap operation, a first operand that identifies the first address register, and a second operand that identifies the second address register.

7. The method of claim 5 wherein the first address register and the second address register comprise a base register for the first memory buffer and a base register for the second memory buffer, respectively.

8. The method of claim 5 wherein the first address register and the second address register comprise an index register for the first memory buffer and an index register for the second memory buffer, respectively.

9. The method of claim 8 wherein responding to the swap instruction further comprises swapping the contents of a base register for the first memory buffer and a base register for the second memory buffer.

10. A digital information processor comprising:
    a first address register for storing a first memory address corresponding to a first memory location;
    a second address register for storing a second memory address corresponding to a second memory location; and
    a circuit that receives a swap instruction, which specifies a swap operation for address registers that are identified explicitly or implicitly, and responds to the swap instruction by swapping the contents of the first address register with the contents of the second address register.

11. The digital information processor of claim 10 wherein the circuit comprises:
    an instruction decoder for receiving and decoding an instruction, and for generating a signal that indicates a swap instruction; and
    a data address generator for responding to the signal that indicates a swap instruction by swapping the contents of the first address register and the second address register.

12. The digital information processor of claim 11 wherein the data address generator comprises a swap unit for supplying the first address from the first address register to the second address register and supplying the second address from the second address register to the first address register.

13. The digital information processor of claim 11 wherein the data address generator comprises:
    a control unit for receiving the signal that indicates a swap instruction, and generates control signals in response at least thereto; and
    a register swap unit, receiving the first address from the first address register and receiving the second address from the second address register, and responding to one or more of the control signals by supplying the first address to the second address register and supplying the second address to the first address register, and
    wherein the first address is stored in the second address register, and the second address is stored in the first address register.

14. The digital information processor of claim 10 wherein the first address register is associated with a first memory buffer and the second address register is associated with a second memory buffer.

15. The digital information processor of claim 10 wherein the swap instruction includes an op code that identifies the swap operation, a first operand that identifies the first address register, and a second operand that identifies the second address register.

16. The digital information processor of claim 10 wherein the address from the first address register and the address from the second address register are each supplied to a load/store unit.

17. The digital information processor of claim 14 wherein the first address register and the second address register comprise a base register for the first memory buffer and a base register for the second memory buffer, respectively.

18. The digital information processor of claim 14 wherein the first address register and the second address register comprise an index register for the first memory buffer and an index register for the second memory buffer, respectively.

19. The digital information processor of claim 18 wherein the digital information processor further responds to the swap instruction by swapping the contents of a base register for the first memory buffer and a base register for the second memory buffer.

20. A digital information processor comprising:
   a first address register for storing a first memory address corresponding to a first memory location;
   a second address register for storing a second memory address corresponding to a second memory location; and
   means, responsive to a swap instruction, which specifies a swap operation for address registers that are identified explicitly or implicitly, for swapping the contents of the first address register and the second address register.

21. A data address generator comprising:
   a first address register containing a first address corresponding to a location in a first circular buffer;
   a second address register containing a second address corresponding to a location in a second circular buffer; and
   a circuit that receives a signal that indicates a swap instruction and responds to the signal by swapping the contents of the first address register and the second address register.

22. The data address generator of claim 21 wherein the circuit comprises a swap unit that receives the first address from the first index register and receives the second address from the second index register, and supplies the first address to the second index register and supplies the second address to the first index register.

23. The data address generator of claim 21 further comprising an apparatus for generating target addresses within a group of circular buffers, each circular buffer extending in a memory between bounds defined by a base address and an end address that is equal to a sum of the base address and a length, the apparatus being responsive to the previous address accessed within said buffer, I, and a specified offset, M, the apparatus comprising:
   a register for storing the previous address accessed within said buffer, I;
   a set of registers for storing information which defines the position and size of said circular buffer in memory; and
   an arithmetic logic unit for generating a incremented address by calculating the value of I+M, for generating an address by modifying the value of I+M by the length of the buffer; and for providing the one of an incremented address and a wrapped address which is within the bounds of the circular buffer.

24. A method for use in a digital information processor comprising a pipeline having a future file and an architecture file, the future file being upstream relative to the architecture file, the future file including a first address register and a second address register, the architecture file including a first address register and a second address register, the method comprising:
   swapping the contents of the first address register and the second address register in the future file in response to a swap instruction;
   generating and sending one or more control signals from the future file to the architecture file in response to the swap instruction; and
   swapping the contents of the first address register and the second address register in the architecture file in response to the one or more control signals.

25. A method for use in a digital information processor comprising a pipeline having a first pipeline stage and a second pipeline stage, the first pipeline stage being upstream relative to the second pipeline stage, the first pipeline stage and the second pipeline stage each being capable of performing an operation, the method comprising:
   performing the operation in the first pipeline stage in response to an instruction;
   generating and sending one or more control signals from the first pipeline stage to the second pipeline stage in response to the instruction; and
   performing the operation in the second pipeline stage in response to the one or more control signals.

* * * * *